United States Patent [19]
Hishida

[11] Patent Number: 5,764,454
[45] Date of Patent: Jun. 9, 1998

[54] THIN-FILM MAGNETIC HEAD WITH IMPROVED BONDING CHARACTERISTICS AND PEELING RESISTANCE OF INSULATING FILM TO SUBSTRATE

[75] Inventor: Tatsuaki Hishida, Mishima-gun, Japan

[73] Assignee: Read-Rite SMI Corporation, Osaka, Japan

[21] Appl. No.: 774,972

[22] Filed: Dec. 26, 1996

[30] Foreign Application Priority Data

Dec. 26, 1995 [JP] Japan ................... 7-350853

[51] Int. Cl.⁶ ............................................. G11B 5/147
[52] U.S. Cl. ............................................. 360/126
[58] Field of Search ................................. 360/126

[56] References Cited

U.S. PATENT DOCUMENTS 5,173,826  12/1992  Bischoff ................... 360/126

*Primary Examiner*—A. J. Heinz
*Attorney, Agent, or Firm*—Blakely Sokoloff Taylor Zafman, LLP

[57] ABSTRACT

The object of the present invention is to improve the bonding characteristics and peeling resistance of the insulating film formed on the substrate of a thin-film magnetic head.

An insulating film consisting of $Al_2O_3$ is formed by sputtering on the surface of an ALTIC substrate in which numerous recesses and projections (in which the projecting portions consist of TiC) have been formed by selectively removing the alumina portions of said substrate by etching using an RIE process. An electromagnetic transducer element circuit is then laminated on the surface of said insulating film.

Since the contact area between the substrate surface and the insulating layer is increased, and especially since the contact area between the TiC and the $Al_2O_3$ is increased due to the projection of the TiC, the bonding force between the two films is increased, and the resistance to peeling is conspicuously improved. Accordingly, the manufacturing yield is improved and the durability of the heads manufactured is also improved, so that slider miniaturization can easily be accomplished.

2 Claims, 2 Drawing Sheets

THIN-FILM MAGNETIC HEAD WITH IMPROVED BONDING CHARACTERISTICS AND PEELING RESISTANCE OF INSULATING FILM TO SUBSTRATE

DETAILED DESCRIPTION OF THE INVENTION

1. Technical Field of the Invention

The present invention concerns a thin-film magnetic head which is used in memory devices such as magnetic disk drives of computers or word processors, etc. More specifically, the present invention concerns a thin-film magnetic head with a structure in which an electromagnetic transducer element circuit is formed on the surface of a protective film which is formed on the surface of a substrate.

2. Prior Art

Thin-film magnetic heads used in magnetic disk drives, etc., are commonly heads in which an insulating film consisting of alumina ($Al_2O_3$) is formed on the surface of a substrate consisting of alumina—titanium carbide ($Al_2O_3$—TiC), and an electromagnetic transducer element circuit is formed by means of a thin-film technique on the surface of the aforementioned insulating film. The aforementioned insulating film is ordinarily formed by means of a vacuum deposition process such as a sputtering process, etc., on the surface of a substrate which has been finished to a mirror surface in the wafer state. Substrates on which electromagnetic transducer element circuits have been formed in the wafer state are cut out as sliders in a subsequent process.

Problems which the Present Invention Attempts to Solve

In recent years, as memory devices such as hard disk drives, etc., have been reduced in size and manufactured with higher recording densities, the miniaturization of thin-film magnetic heads has progressed so that sliders cut from wafers have tended to become smaller. As a result, the substrate area on which the aforementioned electromagnetic transducer element circuit is formed in each slider has become smaller, so that the absolute bonding area of the insulating film has also become smaller. Consequently, when the substrates are cut out as sliders in a subsequent process, working strain and strain caused by thermal stress, etc., are generated, so that the insulating film tends to peel from the substrate, thus creating problems in terms of a drop in the yield of the manufacturing process and a drop in the durability of the thin-film magnetic heads manufactured.

The present invention was devised in light of the above-mentioned problems encountered in the prior art; the object of the present invention is to provide a thin-film magnetic head in which the bonding force of the insulating film with respect to the substrate of the thin-film magnetic head, i.e., the peeling resistance of said insulating film, is improved so that the head can withstand miniaturization.

Means used to Solved the Abovementioned Problems

The thin-film magnetic head of the present invention which is used in order to achieve the abovemention object is characterized by the fact that in a thin-film magnetic head in which an electromagnetic transducer element circuit is formed on a substrate consisting of $Al_2O_3$—TiC (hereafter referred to as an "ALTIC substrate") with an insulating film consisting of $Al_2O_3$ interposed between said substrate and said circuit, numerous recesses and projections in which the projecting portions consist of titanium carbide (TiC) are formed in the surface of the aforementioned substrate by selectively removing the alumina portions of said substrate surface by means of an etching process such as a reactive ion etching process (hereafter referred to as an "RIE process"). etc., and the aforementioned insulating film is formed on this surface in which recesses and projections are formed.

The formation of recesses and projections in the substrate surface as described above increases the contact area between the substrate surface and the insulating film. In particular, by causing the TiC to project, an increase is obtained in the contact area between said TiC and the $Al_2O_3$ of the insulating film. Generally, in the case of $Al_2O_3$ films formed by sputtering, the actual film composition may be viewed as $Al_2O_x$. This $Al_2O_x$ has the property of bonding more strongly with TiC (which contains carbon atoms) than the oxide $Al_2O_3$. Accordingly, by causing the aforementioned TiC to project from the substrate surface so that the contact area between said TiC and the insulating film is increased, it is possible to strengthen the bonding force of the protective film with respect to the substrate, so that the peeling resistance of said film is conspicuously improved.

An RIE process is most suitable for forming the aforementioned recesses and projections in an ALTIC substrate surface. The reason for this is as follows: i.e., in the case of an RIE process, the amount of etching can be finely controlled and the object of etching can be selected by controlling the bias voltage (applied primarily to the substrate), etc., so that the aforementioned TiC can be caused to project as in the present invention. For example, in the case of other dry etching processes such as ion milling, etc., or wet etching processes such as hydrofluoric acid etching, etc., the etching rate varies according to the etching conditions. Accordingly, in cases where a fine etching amount is required (as in the present invention), it is extremely difficult to control the etching depth, i.e., the step height, by means of the etching time.

Furthermore, when it is attempted to finish the step height of the recesses and projections in the substrate surface to a value smaller than 10 angstroms using an RIE process, the etching conditions approach the boundary between the etching conditions for TiC projections and the etching conditions for $Al_2O_3$ conditions; as a result, control problems arise, especially problems in terms of reproducibility. In such cases, moreover, the amount of projection of the TiC is reduced so that the contact area is diminished, thus making it impossible to obtained the abovementioned effect of increasing the bonding force. Meanwhile, the respective particle sizes of the TiC and $Al_2O_3$ in the ALTIC substrate are both approximately 1 micron; accordingly, if the step height of the aforementioned recesses and projections exceeds 1 micron, the proportion of the $Al_2O_3$ covering the TiC surfaces of the substrate subjected to sputtering is reduced, so that the bonding force drops. Thus, it is desirable that the upper limit of the step height be 1 micron.

Working Configurations of the Invention

Below, a preferred working configuration of the present invention will be described in detail with reference to the attached figures:

FIG. 1 is a schematic perspective view of a thin-film magnetic head to which the present invention has been applied. FIG. 2 is a sectional view along line II—II in FIG. 1. This thin-film magnetic head has an ALTIC substrate 1 which forms a slider, an insulating film 2 consisting of alumina which is formed over the entire surface of the aforementioned substrate 1, a lower magnetic film 3 and magnetic gap film 4 which are laminated on the surface of the aforementioned insulating film 2, organic insulating films 5 and 6 which are laminated on the surface of the aforementioned magnetic gap film 4, a conductive coil 7 which is sandwiched between said organic insulating films 5 and 6, an upper magnetic film 8 which is formed on top of said organic insulating films 5 and 6, and a protective film 9 consisting of alumina, etc., which covers the electromagnetic transducer element circuit consisting of the respective films 3 through 8. Furthermore, the tip end portion of the lower magnetic film 3 and the tip end portion of the upper magnetic film 8 respectively form a lower magnetic 10 and an upper magnetic pole 11 which face each other across the magnetic gap film 4, so that the overall assembly functions as a magnetic head.

FIG. 3 shows an enlargement of the boundary area between the ALTIC substrate 1 and insulating film 2 in FIG. 2. Here, numerous recesses and projections are formed in the surface of the ALTIC substrate 1 by selectively etching only the $Al_2O_3$ portions 13 using an RIE process, so that the TiC portions 14 are caused to project, and so that the step height is 10 angstroms to 1 micron. RIE conditions which allow the formation of such a surface with recesses and projections are as follows: i.e., using a reactive gas such as freon, etc., as the etching gas, the flow rate of said gas is set at 2 to 50 sccm, the plasma injection power is set at 0.7 to 3 W/cm$^2$, the internal chamber pressure is set at 1 to 5 mTorr, and the bias voltage is set at 0 to −1000 V. The insulating film 2 is formed by sputtering on the surface of this substrate 1 which has recesses and projections. Since a sputtering process is used for the formation of the insulating film 2, said insulating film 2 is formed with a relatively large thickness, e.g., approximately 10 microns. Consequently, even though recesses and projections are formed to some extent in the surface of the ALTIC substrate 1, these recesses and projections are absorbed by the insulating film 2 so that the surface of the insulating film 2 is smooth. Accordingly, there is no danger of any deleterious effect of the subsequent formation of the aforementioned electromagnetic transducer element circuit.

EMBODIMENTS

FIG. 4 is a graph which shows the relationship between the step height of the TiC and $Al_2O_3$ in the surface of the ALTIC substrate 1 and the bias voltage in a case where said substrate surface is etched by means of an RIE process. Here, the RIE conditions were as follows: i.e., CF$_4$ was used as the etching gas, the flow rate of said gas was set at 20 sccm, the plasma injection power was set at 1 W/cm$^2$, the internal chamber pressure was set at 1.5 mTorr, the treatment time was set at 60 seconds, and the bias voltage was set at −300 to −600 V. Under these conditions, a step height (between recesses and projections) of 10 to 300 angstroms was obtained, with TiC forming the projections. As is seen from the results shown in FIG. 4, the step height shows a bias voltage dependence, with said step height increasing more or less in direct proportion to the bias voltage.

FIG. 5 is a graph which shows the relationship of the bonding force between the ALTIC substrate and the insulating film to the step height of the TiC and $Al_2O_3$ in a case where an ALTIC substrate which had been finished under the conditions shown in FIG. 4. This bonding force, i.e., resistance to peeling, was measured by means of a scratch tester. Furthermore, the numerical bonding force values shown in the graph are normalized, with a case in which there is no step height between the TiC and $Al_2O_3$ taken as 1.

Under these conditions, the bonding force reaches a maximum when the step height is approximately 50 angstroms. If the step height is increased even further, the bonding force gradually decreases. The reason for this is through to be as follows: specifically, in the case of a step height of 10 to 50 angstroms, the bonding force increases with an increase in the contact area between the insulating film and the TiC of the substrate. However, when the step height exceeds 50 angstroms, the proportion of the protective film covering the TiC projections in the substrate surface gradually decreases, so that the bonding force drops. Furthermore, the increase seen in the bonding force when the step height is 50 angstroms or less is greater than the value corresponding to the predicted increase in the contact area between the TiC and the insulating film in cases where the particle size of the TiC is 0.5 microns to 1 micron. The reason for this is thought to be as follows: i.e., since recesses and projections are also present in the surfaces of the TiC particles (FIG. 3), the actual contact area is greater than the predicted contact area; furthermore, these recesses and projections act as anchors, so that the bonding force is increased even further.

Merits of the Invention

In the thin-film magnetic head of the present invention, as is clear from the above description, an electromagnetic transducer element circuit is formed (with an insulating film consisting of $Al_2O_3$ interposed) on the surface of an ALTIC substrate in which numerous recesses and projections have been formed (with the projecting portions consisting of TiC) by selectively removing the alumina portions of said substrate by means of an etching process such as an RIE process, etc. As a result, the contact area between the substrate surface and the insulating film is increased, and since the TiC in particular forms projections, the contact area between said TiC and the $Al_2O_3$ of the insulating film is increased, thus increasing the bonding force between the two films, so that the peeling resistance is conspicuously improved. Accordingly, the manufacturing yield is increased and the durability of the manufactured heads is also improved, so that slider miniaturization and the accompanying miniaturization of thin-film magnetic heads can be handled.

EXPLANATION OF SYMBOLS

Figure 1:
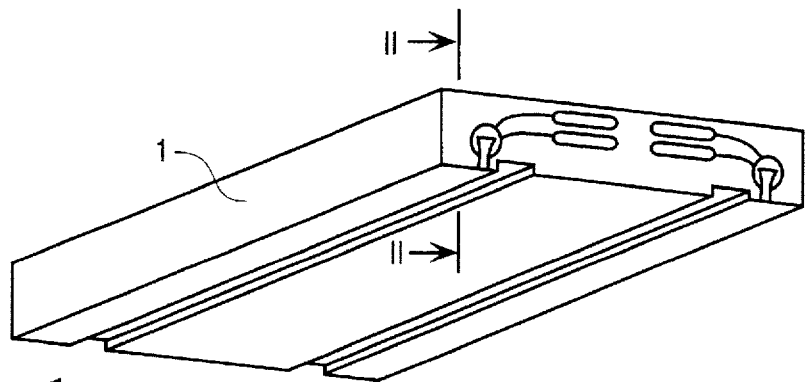
FIG. 1 is a schematic perspective view of a thin-film magnetic head to which the present invention has been applied.
Figure 2:
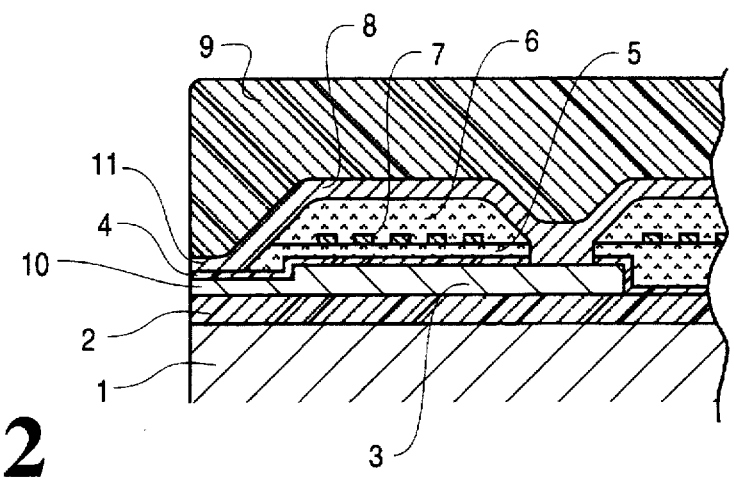
FIG. 2 is a sectional view along line II—II in FIG. 1.
Figure 3:
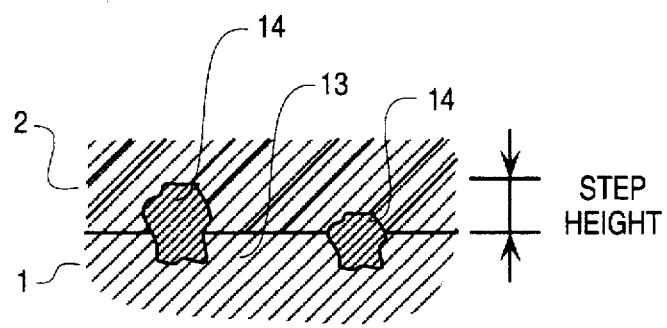
FIG. 3 shows an enlargement of the boundary area between the ALTIC substrate and the insulating film in FIG. 2.
Figure 4:
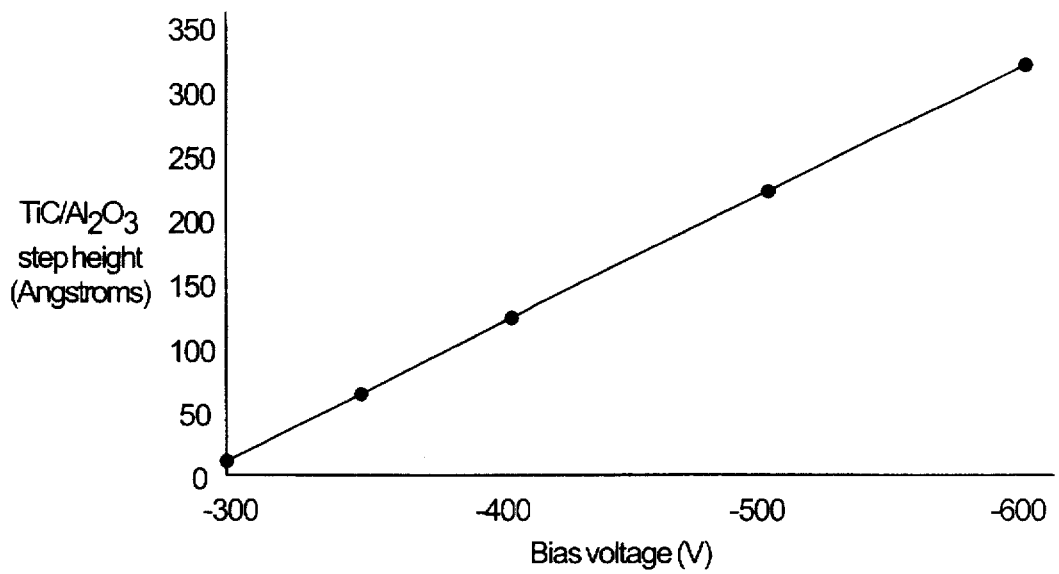
FIG. 4 is a graph which shows the relationship between the step height of the TiC and $Al_2O_3$ in the surface of the ALTIC substrate 1 and the bias voltage in a case where said substrate surface is etched by means of an RIE process.
Figure 5:
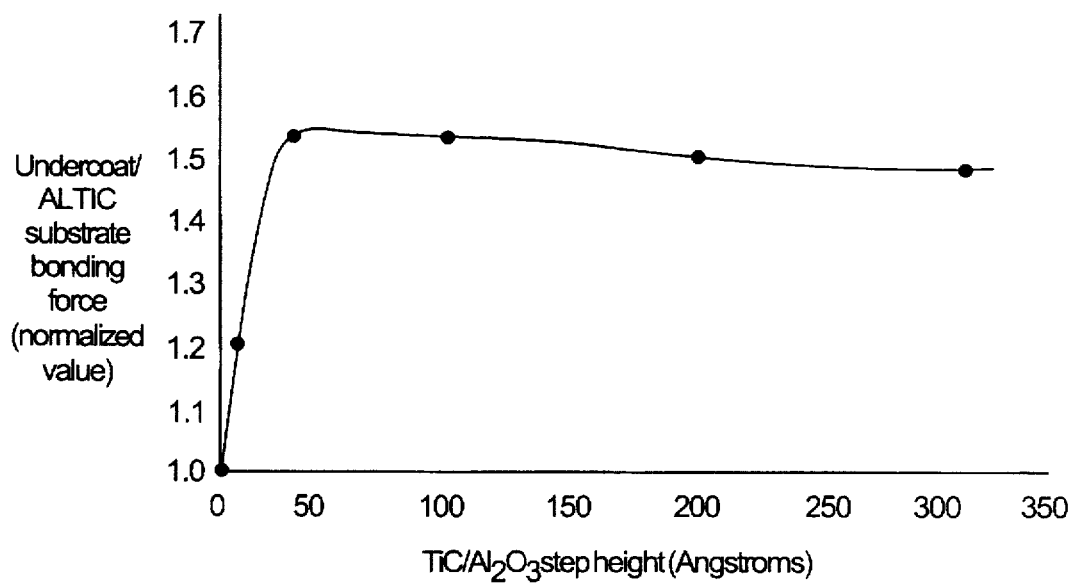
FIG. 5 is a graph which shows the relationship of the bonding force between the ALTIC substrate and the insulating film to the step height of the TiC and $Al_2O_3$

1 ALTIC substrate, 2 Insulating films, 3 Lower magnetic film, 4 Magnetic gap film, 5, 6 Organic insulating films, 7

Conductive coil, 8 Upper magnetic film, 9 Protective film, 10 Lower magnetic pole, 11 Upper magnetic pole, 13 $Al_2O_3$ portions, 14 TiC portions.

I claim:

1. A thin-film magnetic head, comprising:

a substrate including alumina—titanium carbide ($Al_2O_3$—TiC);

an insulating film including alumina ($Al_2O_3$) formed on a surface of the substrate; and an electromagnetic transducer element circuit formed on the surface of the insulating film;

wherein a plurality of recesses and projections including titanium carbide (TiC) portions are formed in the surface of the substrate by etching alumina portions of the substrate surface, wherein the insulating film is formed on the substrate surface in which the plurality of recesses and projections are formed.

2. A thin-film magnetic head, as defined in claim 1, wherein the plurality of recesses and projections are formed by a reactive ion etching process such that a step height of 10 angstroms to 1 micron is obtained.

* * * * *